US006681644B2

(12) United States Patent
Rosalik, Jr. et al.

(10) Patent No.: US 6,681,644 B2
(45) Date of Patent: Jan. 27, 2004

(54) FLOWMETER FOR MEASURING EXTREMELY LOW FUEL MASS FLOWS

(75) Inventors: Martin E. Rosalik, Jr., Oakland, MI (US); Stephen Roy Dillon, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 6 days.

(21) Appl. No.: 10/124,646

(22) Filed: Apr. 17, 2002

(65) Prior Publication Data
US 2003/0196494 A1 Oct. 23, 2003

(51) Int. Cl.[7] ............................................. G01F 1/22
(52) U.S. Cl. ........................ 73/861.57; 73/195
(58) Field of Search .................. 137/599.13; 73/195, 73/196, 197, 861.57, 861.56, 305, 322

(56) References Cited
PUBLICATIONS

"On–Line In–situ Fuel Rate Indicator for Gasoline Direct Injection Engines", Dr. Eng. Murad M. Ismailov, *Summary to Development and Production Project—USA*, pp 1–3; Proceedings of ASME?JSME FEDSM'99—1999 ASME/JSME Fluids Engineering Division Summer Meeting, San Francisco, CA Jul. 18–23, 1999, Presentation Category: F–215.

*Primary Examiner*—Edward Lefkowitz
*Assistant Examiner*—Corey D. Mack

(57) ABSTRACT

A flowmeter capable of real-time fuel mass flow measurement involving extremely low fuel mass flow quanta. The flowmeter includes a dual flow path conduit system, a flow control for alternating the selection of one flow path exclusive of the other flow path, an indicator tube interfaced with the conduit system, an indicator shuttle slidably mounted in the indicator tube, and a sensor for sensing the position of the indicator shuttle relative thereto.

20 Claims, 2 Drawing Sheets

FLOWMETER FOR MEASURING EXTREMELY LOW FUEL MASS FLOWS

TECHNICAL FIELD

The present invention relates to flowmeters for measuring the mass per unit time of flow of a liquid. More particularly, the present invention is a flowmeter for measuring a quantized mass of fuel flow. Still more particularly, the present invention is a flowmeter of the aforesaid type capable of measuring extremely small fuel mass flow quanta.

BACKGROUND OF THE INVENTION

The ever increasing sophistication of control of the various processes of internal combustion engines has provided increased mileage, decreased emissions and better overall performance. These advances include the widespread use of electronic controls and fuel injection. Fuel injectors, controlled electronically, provide precise, timed fuel injections directly into the combustion chamber at the most opportune portion of the engine cycle. One of the remaining issues of engine control relates to knowing the real-time quantized fuel flow mass delivered to a combustion chamber by its respective fuel injector.

Fuel flows, on a cycle resolved or on a per injection basis, have been difficult, if not impossible to quantify using conventional mass flowmeters. Therefore, a new style of mass flow meter is required to quantify small flows (mass quanta) accurately to within 0.1 mg per injection. The need for this type of higher accuracy device is to make better mass specific emission measurements. Fast low flow exhaust devices exist for cycle resolved missions but no information is available for cycle resolved input of the reactants. Further, most other flowmeters do not operate at the high pressures required for direct injection internal combustion engines.

Accordingly what remains needed in the art is a flowmeter capable of measuring extremely small fuel mass flow quanta in real-time.

SUMMARY OF THE INVENTION

The present invention is a flowmeter capable of real-time fuel ass flow measurement involving extremely low fuel mass flow quanta.

The flowmeter according to the present invention includes a dual flow path conduit system, a flow control for alternating the selection of one flow path exclusive of the other flow path, an indicator tube interfaced with the conduit system, an indicator shuttle slidably mounted in the indicator tube, and a sensor for sensing the position of the indicator shuttle relative thereto.

In operation, one flow path is first selected, whereupon a first quantum of fuel mass flows down the first selected flow path, causing the indicator shuttle to be displaced in a first direction along the indicator tube an amount related to the volume of the first quantum of fuel mass flow. This first displacement is registered by the sensor, for example optically via change in area of indicator shuttle occlusion of a photo-sensor with respect to a laser source, and is then output to an electronic circuit. Next, the other path is secondly selected, whereupon a second quantum of fuel mass flows down the second selected flow path, causing the indicator shuttle to be displaced in a second direction (opposite to the first direction) along the indicator tube an amount related to the volume of the second quantum of fuel mass flow. This second displacement is also registered by the sensor, again for example optically via change in area of indicator shuttle occlusion of a photo-sensor with respect to a laser source, and is then output to the electronic circuit. A simple algorithm of the electronic circuit calculates the fuel mass flow of each sensor output. This real-time generated fuel mass flow data is then, for example, used by the engine control module to adjust engine operational parameters pursuant to programming.

Accordingly, it is an object of the present invention to provide a flowmeter having the capability of measuring in real-time extremely low fuel mass flow quanta.

This and additional objects, features and advantages of the present invention will become clearer from the following specification of a preferred embodiment.

DESCRIPTION OF THE PREFERRED EMBODIMENT

Figure 1:
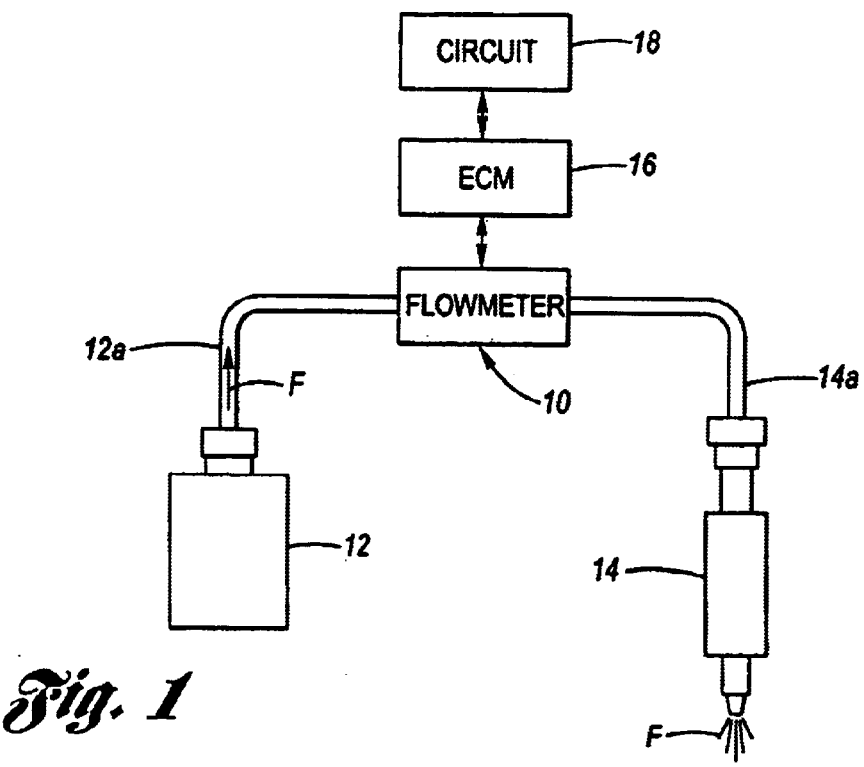
FIG. 1 is a side view of a the flowmeter according to the present invention, shown in operation with respect to a fuel injector.

Referring now to the Drawing, FIG. 1 depicts an environment of operation of the flowmeter 10 according to the present invention. The flowmeter 10 is located between a source of pressurized fuel 12 and a fuel injector 14. An electronic control module 16 is connected to an external circuit 18, wherein electronic components of the flowmeter (discussed hereinbelow) are operably interfaced. Pressurized fuel F (as for example between 1,000 and 5,000 psi) is delivered to the fuel injector 14 by the pressurized fuel source 12, wherein the fuel passes through the flowmeter 10. The flow of fuel is quantized, in that an injection is timed pursuant to programming of an engine control module which regulates the injection function of the fuel injector.

The primary intent of the present invention is it to provide direct fuel mass flow measurements on an actual pressurized fuel line proximal the fuel injector, wherein data is realized on a cycle-by-cycle basis, and wherein it is preferred for the flowmeter to have sufficient hydraulic damping and fast enough signal response time for providing real-time data output on an intra-cycle basis. The sensor output of the flowmeter is converted electronically by an algorithm to mass flow data. The secondary intent of the present invention is to keep the size of the flowmeter small enough to enable the installation under the hood of test vehicles.

Referring now additionally to FIGS. 2 through 5B, the structure and function of the present invention will be detailed.

An input fuel line 12a from the source of pressurized fuel 12 communicates with an input port 20 of the flowmeter 10. The input port 20 communicates with a 3-way digital hydraulic valve 22 having an input 24, a first output 26 and a second output 28. Selection of which of the first and second outputs 26, 28 are flowably operative relative to the input 24 is responsive to digital electronic signals from the electronic control module 16. An example of a suitable 3-way digital hydraulic valve is manufactured by Sturman Industries of Colorado Springs, Colo. having an advertised switch time of under 1 millisecond.

Connected to the first output 26 is a first conduit 30, and connected to the second output 28 is a second conduit 32. The first and second conduits 30, 32 are formed in a meter body 34 which may be composed of any durable, rigid material which is suitable for a pressurized fuel environment. For ease of fabrication the meter body 34 may be composed of four separate body members 34a, 34b, 34c, 34d mutually joined in a leak-proof manner by any suitable connection modality. The meter body 34 is configured so as to provide an interior space 36.

An indicator tube 38 is placed in the interior space 36, wherein each end of the indicator tube is joined, respectively, in a communicating manner with the first and second conduits 30, 32. In this regard, the indicator tube 38 is rigidly affixed to the meter body 34 during assembly of the meter body, and a leak-proof seal is provided between the ends of the indicator tube 38 and the first and second conduits 30, 32. The preferred indicator tube 38 is optically clear, having an index of refraction equal to that of the fuel F. It is additionally preferred for the indicator tube to be composed of quartz or a pyrex glass, either of which having a polished sidewall of the passageway 38a thereof. The indicator tube 38 may be provided, for example, by drilling a block of quartz, or other suitable fabrication technique. The exterior shape and the shape of the passageway 38a may or may not be cylindrical.

Located within the passageway 38a of the indicator tube 38 is an indicator shuttle 40. The sidewall 40a of the indicator shuttle 40 is also polished, and is dimensioned to complementarily fit the shape of the passageway 38a, wherein there is a slip-fit therebetween such that the shuttle is easily slidable along the inside of the passageway. The slip-fit may be, for example, assured by a verification test in which a dry slip-fit is observed prior to final assembly. By way of example, a clearance between the sidewall 40a of the shuttle 40 and the sidewall 38a of the passageway 38 may be on the order of about 0.002 inches. The indicator shuttle 40 is composed of a material which is incompressible and matches the density of the fuel F.

Each of the first and second conduits 30, 32 terminate, respectively, at a second 3-way digital hydraulic valve 42 having a first input 44 connected to the first conduit, a second input 46 connected to the second conduit, and an output 48 connected to an output port 50. An output fuel line 14a connects to the fuel injector 14 and communicates with the output port 50. The second 3-way hydraulic valve 42 is preferably identical to the first 3-way digital hydraulic valve and operates as mentioned with respect thereto (in a reverse fuel flow operational sense).

A position sensor 54 is located in the interior space 36, which senses the position of the indicator shuttle 40 relative thereto. The position sensor may be any sensor which senses position of the indicator shuttle 40 relative to the indicator tube 38, for example via a magnetic, optic or sonic sensor. The preferred position sensor is an optical sensor having an emitter component 56 and a receiver component 58. The preferred emitter component 56 is a laser which is powered and controlled, for example, via the electrical circuit 18 and the electronic control module 16. The preferred receiver component 58 is a photo sensor which is sensitive to the light emitted by the laser, and provides a signal output to the electronic control module 16 responsive to the area of the beam 60 which falls upon the photo-sensitive reception area 66 of the receiver component. An example of a suitable position sensor 54 in the form of a laser and photo sensor is available through LMI Technologies, Southfield, Mich. which is advertised to have an analog output at speeds up to 10 kHz, and have an accuracy to within 1 part in 1,000.

Figure 2:
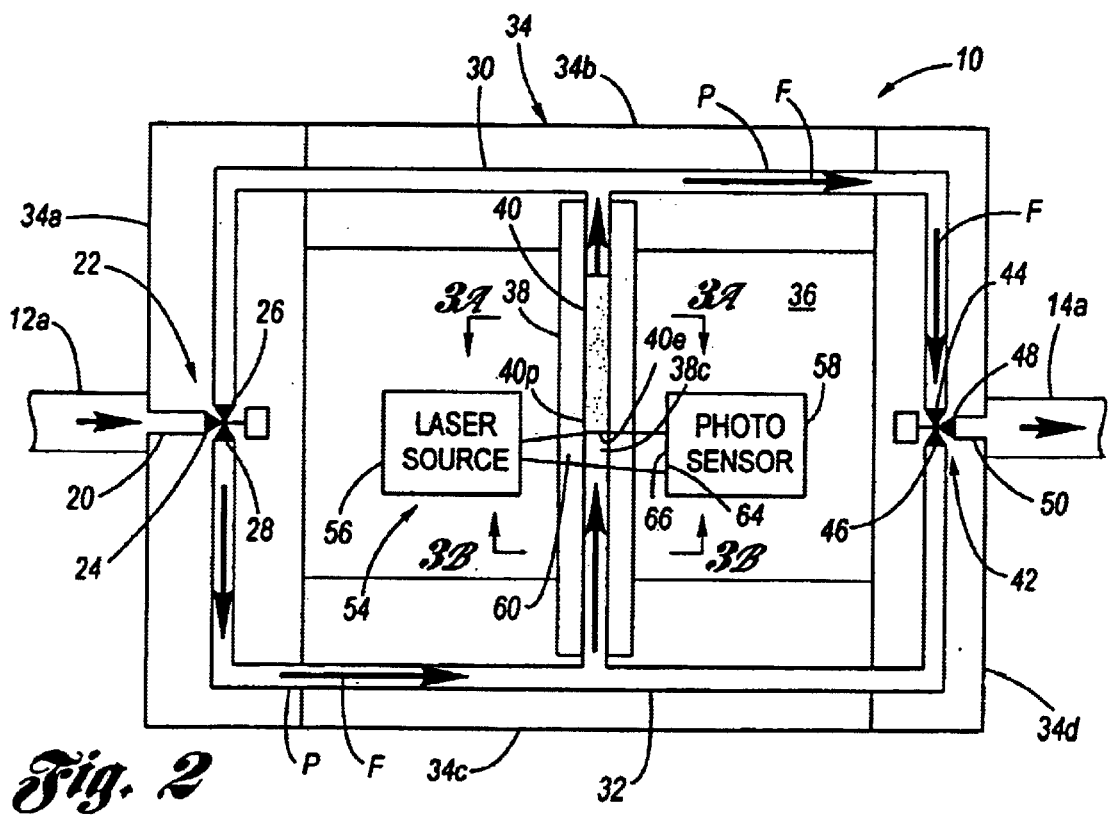
FIG. 2 is a partly sectional side view of the flowmeter according to the present invention, shown at the end of a first quantum of fuel mass flow along a first flow path.
Figure 3A:
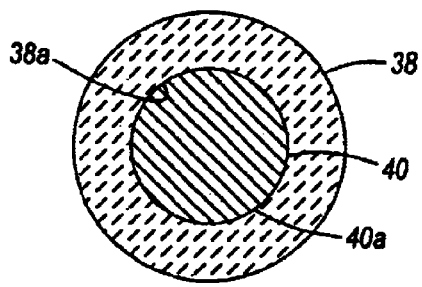
FIG. 3A is a sectional view, seen along line 3A—3A of FIG. 2.
Figure 3B:
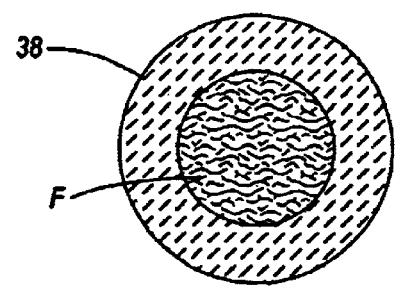
FIG. 3B is a sectional view, seen along line 3B—3B of FIG. 2.
Figure 4:
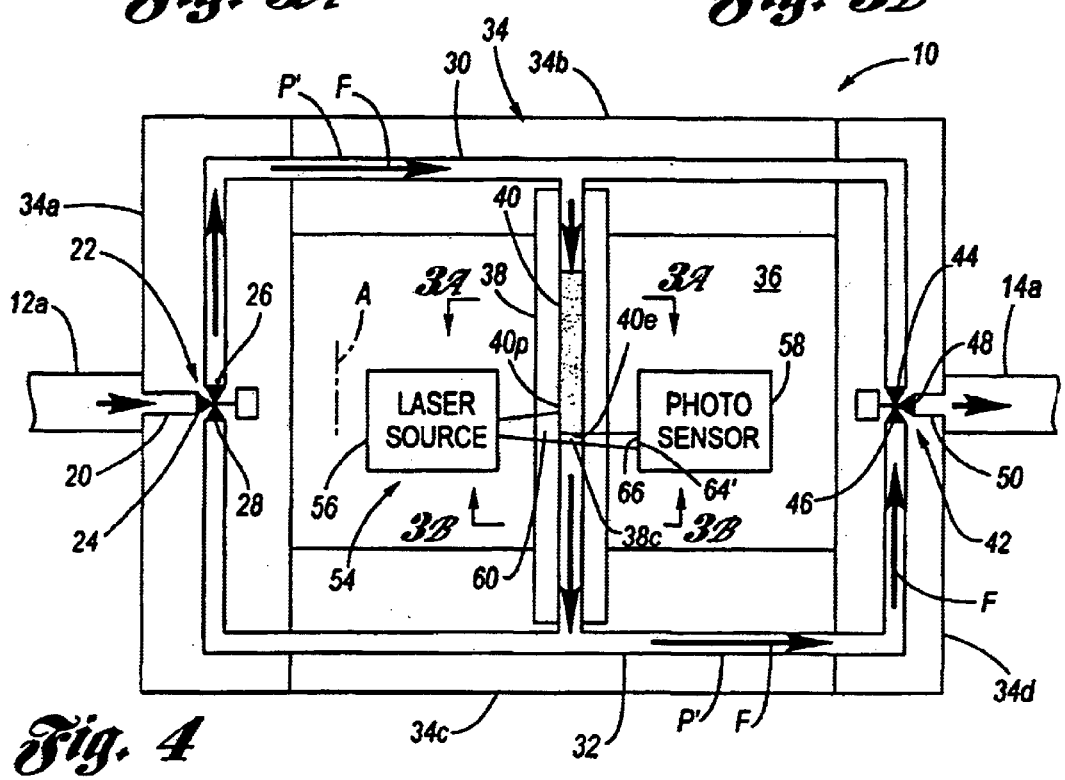
FIG. 4 is a partly sectional side view of the flowmeter according to the present invention, shown at the end of a second quantum of fuel mass flow along a second flow path.

With respect to operation of the indicator shuttle 40 vis-a-vis the position sensor 54, the indicator shuttle is opaque, preferably fully opaque, to the light emitted by the emitter so that an end portion 40p' of the indicator shuttle 40 occludes the beam 60 (see FIGS. 2 and 4). In this regard, the light occluding properties of the indicator shuttle 40 is such that it casts a shadow of the beam 60 from the emitter component 56 upon the reception area 66 of the receiver component 58, as shown at FIGS. 2 and 4.

Figure 5A:
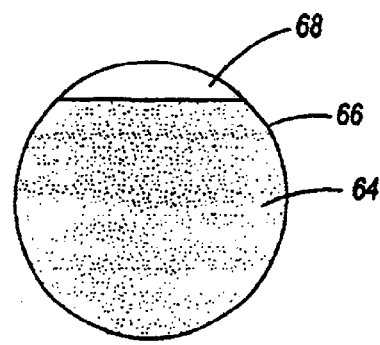
FIG. 5A is a plan view of a sensor surface, showing occlusion area with respect to the indicator shuttle at the relative position shown at FIG. 2.
Figure 5B:
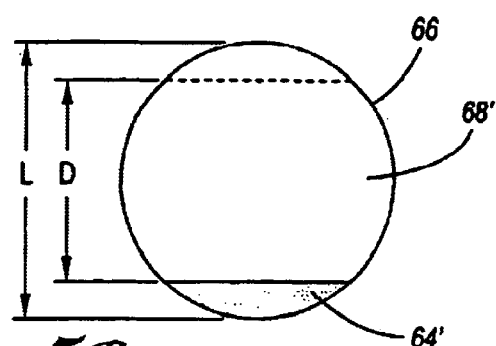
FIG. 5B is a plan view of the sensor surface, showing occlusion area with respect to the indicator shuttle at the relative position shown at FIG. 4.

For example, FIG. 5A shows the reception area 66 when the indicator shuttle 40 is at the position shown at FIG. 2. In this case, the beam 60 is occluded by only a small end portion 40p of the indicator shuttle 40, so that there is a large area 64 where the beam strikes upon the reception area, and but a small area 68 where the beam does not strike upon the reception area. For example further, FIG. 5B shows the reception area 66 when the indicator shuttle 40 is at the position shown at FIG. 4. In this case, the beam 60 is occluded by a large end portion 40p' of the indicator shuttle 40, so that there is but a small area 64' where the beam strikes upon the reception area, and a large area 68' where the beam does not strike upon the reception area. The signal output of the receiver component 58 is related to how much of the beam is occluded by the indicator shuttle.

A predetermined maximum reciprocable displacement of the indicator shuttle 40 along the indicator tube 38 is defined to be within a reception length L of the beam 60 (unshielded) falling upon the reception area 66 which is parallel to the detection axis A of the reception area (see FIG. 4, where it is shown that the detection axis is parallel to the centerline of the passageway 38a). Therefore, the maximum reciprocable displacement D of the indicator shuttle 40 must be smaller than the reception length L. For example, given a 24 mm long sensor reception length along the detection axis, indicator shuttle reversal is necessary before the indicator shuttle edge 40e of the indicator shuttle 40 reaches the ends of the reception length (that is, the maximum reciprocable displacement of the indicator shuttle is under 24 mm). In this example of a 24 mm reception length, the position sensor 54 can resolve indicator shuttle displacements of 0.001 inches at high speed relative to a 100 Hz maximum fuel injection frequency. The output from the receiver component 58 provides an absolute indication of position of the indicator shuttle edge 40e of the indicator shuttle 40 based upon the shadow cast on the reception area 66, wherein a voltage output is related to the area of the shadow cast, for example between 0 and 10 volts.

In operation, an engine control module periodically commands a fuel injector 14 to inject a quantity of fuel into a combustion chamber. Between these commands, the electronic control module 16 commands the two 3-way valves 22, 42 to switch the flow paths. The first flow path P', shown at FIG. 4, has a fist segment along the first conduit 30 (due to the first output 26 being open and the second output 28 being closed), a second segment along the indicator tube 38 in a first direction, and a third segment along the second conduit 32 (due to the second input 46 being open and the first output 44 being closed). The second flow path P', shown at FIG. 2, has a first segment along the second conduit 32 (due to the second output 28 being open and the first output 26 being closed), a second segment along the indicator tube 38 in a second direction that is opposite the first direction, and a third segment along the first conduit 30 (due to the first input 44 being open and the second output 46 being closed). Each fuel injection delivers a unique quantum of fuel to the fuel injector, wherein the indicator shuttle 40 shuttles back and forth (reciprocates) an amount related to the volume of each injection. The amount of the beam 60 occluded by the indicator shuttle as a result of each injection is dependent upon the position of the indicator shuttle edge 40e at the end of each injection. The amount of occlusion of the beam 60 directly relates to the signal output produced by the receiver component 58. The signal output is sent to the electronic control module 16, which then outputs a signal to the external circuit 18 which is interfaced, for example, with the engine control module.

With the foregoing details recounted, it is instructive to further consider the following commentaries regarding implementation of the flowmeter 10.

A primary feature of the flowmeter 10 is an indicator tube having an index of refraction equal to that of the liquid, and a light shielding indicator shuttle having a density equal to that of the liquid. These features provide a non-contact high accuracy method of resolving displacement of the indicator shuttle in response to quantized fuel mass flow. In this regard, the indicator shuttle will move nearly instantaneously with the liquid flow. In comparison with other high pressure devices for flow measurement, there is seen sealing and pulsation difficulty. With the flowmeter 10, leakage and internal drag are minimized.

The position sensor may utilize any suitable frequency of electromagnetic radiation (as for example optical, ultraviolet, or microwave frequencies), and, alternatively, may be other than electromagnetic radiation based, as for example it may operate on a sonic basis, wherein the indicator shuttle is phonon shielding. Alternatively further, the indicator shuttle may be magnetic and the position sensor may be a magnetometer. An optical embodiment of the position sensor would use a laser LED or other such commercial collimated light source and an optical receiver sensor to count pulses or the displacement of the reciprocably moving indicator shuttle. By comparison, other meters rely on rotating mechanical parts with seals and possible leaks. They use exotic pressure compensation schemes to balance pressures that cause inaccuracy, and do not tolerate accoustic wave pulses and pressure fluctuations. The flowmeter 10 tolerates pulses; it is designed to measure them.

The flowmenter 10 should have the capability of resolving directional ambiguity and correcting for it. In this regard, the position sensor is connected to a signal conditioner and/or an electronic control module (computer controller). Thus, forward and reverse pulses can be resolved and accounted for. The reception area may be a line of photodiodes or other such light absorbing device to sense the absolute position of the edge of the indicator shuttle may be used to determine the indicator shuttle displacement.

The diameter of the indicator tube and the displacement of the indicator shuttle comprise a direct volume measurement at a measurement chamber 38c. By using small diameter indicator tubes of between 2 to 3 mm inside diameter, fuel flows as low as 0.1 milligrams per pulse should be possible, wherein the position sensor sends signals related thereto to the electronic control module. The electronic control module (or signal conditioning module) then uses the temperature, specific gravity, and density information which is characteristic of the fuel to calculate fuel mass per injection event. The flowmeter 10 resolves the time history of discrete injection events as they happen, and does not integrate over thousands of cycles for an average. The known diameter of the indicator tube and the certainty of the indicator shuttle displacement provide absolute accuracy of the signal output.

The operational methodology of the flowmeter 10 is a reversing indicator shuttle displacement, a likeness to a reversing spool type hydraulic valve of an "H" bridge. Several types of suitable electro and/or servo hydraulic 3-way valves are available on the market.

Unlike most other fuel meters the flowmeter 10 operates at injection pressure. Further, it is mounted directly or in close proximity to the fuel injector. By comparison, other meters are housed in cabinets several feet or yards from the engine. The reduction of fuel volume within the system increases accuracy. By having a small flowmeter operating at high pressure close to the fuel injector, vapor introduced from excess plumbing and pumps is negligible. This further simplifies the metering system and reduces size and the contained volume within the measuring chamber 38c.

The flowmeter 10 is a small, compact device which can also be used for a variety of liquids, besides fuels; and can also be used for many applications, automotive and other than automotive. With regard to automotive applications, the flowmeter 10 can be used with a wide variety of fuels, vehicles, farm implements, motorcycles, marine, and may include small injected engines, direct and port fueled, of displacements less than 50 cc.

The flowmeter 10 is easily adaptable to differing measuring environments. Typically, all that is needed is changing the indicator tube and the indicator shuttle, while the valving, electronics, position sensor and meter body remain unchanged. For example, single cylinder engines of 500 cc would require a 3 mm internal diameter indicator tube and matching indicator shuttle. Larger engines could use a 5 mm or greater internal diameter indicator tube with matching indicator shuttle. This feature builds in flexibility while reducing cost and complexity.

Any transparent liquid can be used. Both gasoline and diesel fuel will work nicely. Low pressure fuel systems can be used as well. Any pulsed per cycle injector can be metered on a cyclical basis. The key is in matching the density of the liquid to the density of the indicator shuttle. This matching of density provides simultaneous movement of the indicator shuttle with the movement of the adjacent columns of fuel (at either end of the indicator shuttle). The fuel and the indicator shuttle are inside the indicator tube, which is a drilled and polished quartz (pyrex, etc.) block or tube.

Care must be taken to allow a slip-fit between the indicator tube and the indicator shuttle. The issues associated with sidewall interaction vis-a-vis the passageway and the indicator shuttle, internal leaking past indicator shuttle, fast reset, and hydraulic disturbances to the injector are the major concerns. The sidewall interaction will be addressed by a verified dry slip fit at assembly, wherein polishing and a suitable diametric clearance (by way of mere non-limiting example, on the order of about 0.002") should be sufficient. Clearance and density matching will minimize internal leakage past the indicator shuttle, wherein the indicator shuttle should move as if it were the fuel itself. With negligible pressure differential, the clearance should not leak. The 3-way valves should introduce no volume differential to the system as they move. They also move a short distance in very short times, so there should be no hydraulic force applied internal or external to the system. Accordingly, introduced resonance and ringing should be minimized. With regard to the effect of the flowmeter 10 on fuel injector performance, experiments on fuel injectors at 10 Mpa have shown that the fuel injector itself is a major contributor to system perturbations. The flowmeter 10 may need damping to deal with fuel injector step function like behavior.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A flowmeter comprising:
   a first conduit having a first end and a second end;
   a second conduit having a first end and a second end;
   a first valve connected to said first ends of each of said first and second conduits, said first valve selectively switching an input thereof into exclusive communication with either of said first and second conduits;
   a second valve connected to said second ends of each of said first and second conduits, said second valve selectively switching an output thereof into exclusive communication with either of said first and second conduits;
   an indicator tube connected to said first and second conduits between said first and second ends thereof;
   an indicator shuttle reciprocably movable within said indicator tube; and
   a position sensor, said position sensor providing a signal responsive to position of the indicator shuttle relative to said indicator tube.

2. The flowmeter of claim 1, further comprising an electronic control connected with said first and second valves, wherein said electronic control provides said selective switching.

3. The flowmeter of claim 1, wherein a liquid flows through said flowmeter, said liquid having a liquid density, said indicator shuttle having a shuttle density substantially equal to said liquid density.

4. The flowmeter of claim 1, wherein said position sensor comprises:
   an emitter component; and
   a receiver component;
   wherein said emitter and receiver components are aligned with respect to said indicator shuttle such that an emission from said emitter component to said receiver component is shielded an amount related to the position of the indicator shuttle.

5. The flowmeter of claim 4, wherein said receiver component has a reception area, said emitter emitting a beam upon said reception area having reception length parallel to said indicator tube, wherein said indicator shuttle has an indicator shuttle edge, said indicator edge having a limited reciprocation displacement relative to said indicator tube that is within said reception length.

6. The flowmeter of claim 5, wherein said emitter component is an electromagnetic radiation emitter, and wherein said receiver component is a receiver of the electromagnetic radiation emitted by said emitter component.

7. The flowmeter of claim 6, wherein said liquid has a liquid index of refraction of the electromagnetic radiation, said indicator tube having a tube index of refraction of the electromagnetic radiation substantially equal to said liquid index of refraction.

8. The flow meter of claim 7, wherein said indicator shuttle is shielding to said electromagnetic radiation.

9. The flowmeter of claim 8, wherein a liquid flows through said flowmeter, said liquid having a liquid density, said indicator shuttle having a shuttle density substantially equal to said liquid density.

10. The flowmeter of claim 9, further comprising an electronic control connected with said first and second valves, wherein said electronic control provides said selective switching.

11. A fuel system comprising:
    a source of pressurized fuel;
    a fuel injector; and
    a flowmeter connected to each of said source and said fuel injector such that fuel from said source to said fuel injector passes through said flowmeter, said fuel meter comprising:
    a first conduit having a first end and a second end;
    a second conduit having a first end and a second end;
    a first valve connected to said first ends of each of said first and second conduits, said first valve selectively switching an input thereof into exclusive communication with either of said first and second conduits;
    a second valve connected to said second ends of each of said first and second conduits, said second valve selectively switching an output thereof into exclusive communication with either of said first and second conduits;
    an indicator tube connected to said first and second conduits between said first and second ends thereof;
    an indicator shuttle reciprocably movable within said indicator tube; and
    a position sensor, said position sensor providing a signal responsive to position of the indicator shuttle relative to said indicator tube;
    wherein flow of fuel through said flowmeter is quantized, and wherein said switching provides a successively reverse movement of said indicator shuttle with each successive quantum of fuel passing through said flowmeter.

12. The system of claim 11, further comprising an electronic control connected with said first and second valves, wherein said electronic control provides said selective switching.

13. The system of claim 11 wherein said fuel has a fuel density, said indicator shuttle having a shuttle density substantially equal to said fuel density.

14. The system of claim 11, wherein said position sensor comprises:
    an emitter component; and
    a receiver component;
    wherein said emitter and receiver components are aligned with respect to said indicator shuttle such that an emission from said emitter component to said receiver component is shielded an amount related to the position of the indicator shuttle.

15. The system of claim 14, wherein said receiver component has a reception area, said emitter emitting a beam upon said reception area having reception length parallel to said indicator tube, wherein said indicator shuttle has an indicator shuttle edge, said indicator edge having a limited reciprocation displacement relative to said indicator tube that is within said reception length.

16. The system of claim 15, wherein said emitter component is an electromagnetic radiation emitter, and wherein said receiver component is a receiver of the electromagnetic radiation emitted by said emitter component.

17. The system of claim 16, wherein said fuel has a fuel index of refraction of the electromagnetic radiation, said indicator tube having a tube index of refraction of the electromagnetic radiation substantially equal to said fuel index of refraction.

18. The system of claim 17, wherein said indicator shuttle is shielding to said electromagnetic radiation.

19. The system of claim 18, wherein said fuel has a fuel density, said indicator shuttle having a shuttle density substantially equal to said fuel density.

20. The system of claim 19, further comprising an electronic control connected with said first and second valves, wherein said electronic control provides said selective switching.

* * * * *